(12) United States Patent
Kuehnle et al.

(10) Patent No.: US 9,120,686 B2
(45) Date of Patent: Sep. 1, 2015

(54) WASTEWATER TREATMENT METHODS

(71) Applicant: KUEHNLE AGROSYSTEMS, INC., Honolulu, HI (US)

(72) Inventors: Adelheid R. Kuehnle, Honolulu, HI (US); Martin Johnson, Chester, VA (US); Robert J. Schurr, Honolulu, HI (US)

(73) Assignee: Kuehnle AgroSystems, Inc., Honolulu, HI (US)

( * ) Notice: Subject to any disclaimer, the term of this patent is extended or adjusted under 35 U.S.C. 154(b) by 0 days.

(21) Appl. No.: 14/209,724

(22) Filed: Mar. 13, 2014

(65) Prior Publication Data

US 2015/0001149 A1 Jan. 1, 2015

Related U.S. Application Data

(60) Provisional application No. 61/783,174, filed on Mar. 14, 2013.

(51) Int. Cl.
| | |
|---|---|
| *C02F 3/20* | (2006.01) |
| *C02F 3/34* | (2006.01) |
| *C02F 3/28* | (2006.01) |

(52) U.S. Cl.
CPC . *C02F 3/341* (2013.01); *C02F 3/20* (2013.01); *C02F 3/28* (2013.01); *C02F 3/34* (2013.01)

(58) Field of Classification Search
CPC ............... C02F 3/20; C02F 3/28; C02F 3/34; C02F 3/341

USPC ................... 210/620, 610–611, 220
See application file for complete search history.

(56) References Cited

U.S. PATENT DOCUMENTS

| | | | | |
|---|---|---|---|---|
| 3,436,341 | A * | 4/1969 | Beuthe | 210/627 |
| 4,066,722 | A * | 1/1978 | Pietruszewski et al. | 261/87 |
| 4,337,152 | A * | 6/1982 | Lynch | 210/197 |
| 5,643,453 | A * | 7/1997 | Pannier et al. | 210/605 |
| 7,699,980 | B2 * | 4/2010 | Novak et al. | 210/150 |
| 8,308,944 | B2 * | 11/2012 | Horst | 210/602 |
| 2002/0070164 | A1 * | 6/2002 | Henrich | 210/620 |
| 2011/0068057 | A1 * | 3/2011 | Haley et al. | 210/619 |

OTHER PUBLICATIONS

Anal Chavan et al. "Treatment of hydrocarbon-rich wastewater using oil degrading bacteria and phototrophic microorganisms in rotating biological contactor: Effect of N:P ratio" Journal of Hazardous Materials 154 (2008) 63-72.*

* cited by examiner

*Primary Examiner* — Chester Barry
(74) *Attorney, Agent, or Firm* — Saliwanchik, Lloyd & Eisenchenk (57) ABSTRACT

The present invention relates to improved wastewater treatment systems and methods. In one embodiment, the present invention utilizes microbial consortia and the final effluent of the treated wastewater is remarkably clean, and has low levels of hazardous chemicals, unwanted nutrient values and/or total solids. Advantageously, the wastewater treatment system and method of the present invention reduces the use of chemical compounds in the treatment process. Further, valuable biomasses can be produced from the wastewater using the treatment process of the present invention.

21 Claims, 3 Drawing Sheets

WASTEWATER TREATMENT METHODS

CROSS-REFERENCE TO RELATED APPLICATION

The present application claims the benefit of U.S. Provisional Application Ser. No. 61/783,174, filed Mar. 14, 2013, which is hereby incorporated by reference herein in its entirety, including any figures, tables, or drawings.

FIELD OF THE INVENTION

The present invention pertains generally to improved wastewater treatment systems. In one embodiment, the present invention relates to wastewater treatment systems operation employing added physical mixing of the wastewater and/or the recycle of solids to support increased solids generation and associated compositional modification.

BACKGROUND OF THE INVENTION

Existing wastewater treatment systems suffer from the problem of solid accumulation. The solids from airborne and biomass debris reduce water residence time in the wastewater treatment system, and as a result, negatively affect system performance. Solids are typically removed from wastewater through use of settling tanks or ponds that are unmixed. Specifically, the solids settled by gravity are periodically dredged for subsequent transport to landfills or for use in microbial digesters for biogas generation and then disposal of remaining solids. Removal of any remaining suspended solids is required prior to water outflow. Both operations can cost millions of dollars annually depending on the size of the operation and can require temporary shutdown of partial or all wastewater treatment operations.

Another problem caused by the reduced residence time is higher residual concentrations of nuisance nutrients such as nitrogen (N), phosphorus (P), and sulfur (S) in the final effluent. Increased levels of N and P often exceed the permitted outflow limits for these systems, resulting in potential fines and possible facility shut down for non-compliance of government regulations. Nutrient recovery in the form of biomass becomes attractive for managing these problems while creating value with the biomass.

Other problems stem from oxygen deprivation in the wastewater treatment system. Oxygen is required for the normal processes that convert organic matters to carbon dioxide and water. Additional oxygen can be introduced, via mechanical agitation using surface air, into the wastewater treatment system; however, this approach is inefficient and energy expensive because of the relatively high density of water and its attendant energy consumption.

U.S. Patent Application Publication No. 2010/0237009 A1 describes use of phototactic heterotrophic eukaryotes that can be enriched within the slipstream of wastewater being treated due to their phototactic properties.

U.S. Pat. No. 7,977,085 teaches use of a monoculture of photosynthetic eukaryotic algae, specifically a chlorophyte that is planted de novo in an aqueous environment to cultivate said algae under a continuous stream of carbon dioxide. Disadvantageously, it is difficult to culture algae of a single species over time in existing wastewater systems without continuous enrichment for the species, especially if many other competing microbes are naturally present in wastewater, and if high-rate nutrient recovery is desired.

The ability of microbe consortia to proliferate in low to high salt and low to high pH media at variable temperatures allows scalable mass cultivation, notably in open basins common to wastewater processing. In these conditions, the consortia are compatible with predators and with biologic agents added for specific purposes such as degradation of hydrocarbons from crude oil. The consortia are also compatible with intermittent adjustments of pH through use of a discontinuous stream of carbon dioxide as is currently practiced in wastewater operations. Added $CO_2$ produced biomass yields double that of a paddlewheel-mixed wastewater pond without added $CO_2$, to about 60 MT/ha-yr (0.3 MT/million L, 0.3 g/L), along with the associated acceleration of nutrient value reductions, and it improved bioflocculation for algal harvest (Craggs, R. J., S. Heubeck, T. J. Lundquist, J. R. Benemann. 2011. Algal biofuels from wastewater treatment high rate algal ponds. *Water Science & Technology* 63: 660-665).

Nutrient recovery during log phase growth is clearly influenced by biomass loading density and by baseline N and P content (Tam N. F. Y., Y. S. Wong. 1989. Wastewater nutrient removal by *Chlorella pyrenoidosa* and *Scenedesmus* sp. *Environmental Pollution* 58:19-34). As two examples, recovery efficiency after 3 days using photosynthetic algae was 20% N and 29% $PO_4$, with P at inoculation densities starting with $5 \times 10^5$ cells/ml and 45% N and 52% $PO_4$ and P removal at densities with $5 \times 10^6$ cells/ml under an open system of municipal wastewater with presence of common bacteria and protozoa (Lau P., N. Tam, Y. Wong. 1995. Effect of algal density on nutrient removal from primary settled wastewater. *Environmental Pollution* 89: 59-66). In other systems, seeding with *Scenedesmus* at $1 \times 10^6$ cells/ml with midday temps of 30-34 C resulted in cell doubling in 3 days, reaching 8-fold higher in 8 days, with N reduction from 23.5 mg/L to 3.1 mg/L (Andrade C E, A Vera, C Cárdenas, E. Morales. 2009. Biomass production of microalga *Scenedesmus* sp. with wastewater from fishery. *Rev. Téc. Ing. Univ. Zulia*. Vol. 32:126-134).

Pond management affects loading density. An unmixed pond of 1-meter depth may show a 0.05 g/L biomass density (0.05 MT/million liters) for an algae biomass productivity of about 10 metric tons/ha-yr. In contrast, a paddlewheel-mixed pond at shallower depths such as 0.3-meter depth may show a 0.2 g/L density or 0.2 MT/million L (Craggs, Heubeck et al. 2011).

Advantageously, to promote biologic proliferation for continued effective oxidation, the known practice of adding a hydrocarbon source to a basin during colder temperatures can simultaneously benefit recovery of N, P and other element values by photosynthetic eukaryotes and prokaryotes, as part of the consortium. This is applicable if the photosynthetic eukaryotes and prokaryotes are known mixotrophs that preferentially thrive over strict phototrophs because they can metabolize the added hydrocarbons while still photosynthesizing, albeit at a slower rate under colder temperatures. In this manner, the biomass yield per unit area increases by increasing the culture depth.

One major obstacle in the improvement of microbe-based wastewater treatment is the time and cost associated with designing and building de novo structures that are not normally part of a wastewater system to accommodate processing of a slipstream of wastewater via proliferation of algae biomass. Such an approach is described in, for example, U.S. Patent Application Publication No. 2010/0237009 A1 with the use of purpose-built bioreactors to treat the wastewater. It is not necessary to create a "new" wastewater treatment system designed around the physical constraints of growing or concentrating microbial biomass. For example, U.S. Pat. No. 6,896,804 teaches growing and continuous delivery of photosynthetic microbial cultures into existing wastewater basins, with the culture comprising an assemblage of various microalgae.

Energy company operations, such as those performing hydraulic fracturing and oil refining, are ideal for such operations, offering practical advantages and strong techno-economic rationale for coupling greenhouse gas and liquid effluents with large-scale microbe cultivation in wastewater treatment basins. The principles and designs easily extend to other municipal and industrial wastewater treatment facilities. Similar to other industrial wastewater facilities, each oil company can have its own upstream and downstream wastewater make-up, and composition can vary with geography, crude lots, and processes at a single site or refinery. Microbe consortia can adjust to these variations over time such that the nutrient recovery or other compositional modifications within the ponds is maintained. This approach further demonstrates that treatment facilities can monetize their solids to swiftly recoup the expenditures for system upgrades.

Further, there is a lack of effective and energy efficient mixing methods capable of preventing settling of solids through the basin while producing the desired growth of biomass in situ at a high yield without reducing hydraulic flow and system operations. U.S. Pat. No. 6,896,804 describes mechanical agitation to disperse introduced algae cultures grown ex situ. Disadvantageously, mechanical agitation is highly inefficient for increasing exposure of active volumes to light for photosynthesis in large basins and is highly energy intensive.

In addition, separation of solids from the liquid part of the effluent is required for subsequent processing of the biomass. Many means for separation of solids from the liquid are known in the art, such as use of floating suction dredgers and thickening drums or filters, centrifugation, or flocculation with flotation, or by use of polyelectrolytes and forced flotation using compressed air. However, flocculants may cause toxicity issues for native species exposed to the outflow and for many flocculants the microbes are no longer viable for recycling purposes.

Accordingly, a substantial need exists for a method for improved hydraulic wastewater treatment basins that will enable a process of nutrient recycle to support microbial biomass, especially biomass capable of producing desired bioenergy and other components and, preferably, with high yields and at a low cost. As will be clear from the disclosure that follows, these and other benefits are provided by the present invention.

BRIEF SUMMARY OF THE INVENTION

The present invention relates to improved wastewater treatment systems and methods for providing improved nutrient recovery; for increasing microbial biomass for nutrient recycle, nutrient load reduction, water quality improvement, and renewable energy purposes; and for augmenting performance, thereby meeting existing or planned discharge limits. The invention serves to reduce risk by providing an unlimited and consistent biologically active microbe supply, including a microbe supply enriched for oxygen. The invention can be practiced using equipment that is commercially available.

One aspect of the present invention relates to use of a submerged pneumatic or compressed gas mixing system. This enables modification of the functionality of existing basins. They can be adjusted in configuration and capacity to meet the specific system needs and geometry. In one embodiment, the wastewater basin system has an inflow at or exceeding 300 gal/min and/or hydraulic residence time of about 3 days or longer. In another embodiment, post-oxidation or settling ponds become active nutrient recovery basins. In yet another embodiment, the compressed gas mixing enables compositional modification of wastewater in contemporary basins or those to be newly established.

A second aspect of the present invention is the recycle of solids from the effluent into the system to attain and then maintain microbe consortia in situ. In one embodiment, a dewatering system recovers the viable microbes from the wastewater system effluent without the use of flocculants, which are damaging to ecosystems and increase costs of the wastewater systems. In another embodiment, the solids need not be viable in order to modify the composition of the wastewater, such as through absorption. The level of suspended solids can be adjusted for any desired level of nutrient recovery, compositional modification, or for seasonal effects on operation.

A third aspect of the present invention is generation of a cleansed stream for ultimate disposal and some amount of excess biomass available for further processing. In one embodiment, bioenergy and components thereof are generated by treatment of the biomass.

A fourth aspect of the present invention is the continual reinforcement of the consortium for desired microbial composition active in the wastewater treatment system, including over seasons. These microbes are selected based on local environmental conditions and/or the type of wastewater treatment system to be modified. In one embodiment, the microbial composition comprises the recycled biomass. In one embodiment, the mix of microbes includes, and can be enriched for, those species tolerant of wastewater N:P ratios in excess of 10:1, or any N:P ratio in excess of 10:1, including, but not limited to, 20:1, 30:1, 40:1, 50:1, 60:1, 70:1, 80:1, 90:1, 100:1, 120:1, 150:1, and 200:1. In a preferred embodiment, the microbe species are tolerant of wastewater having N:P ratios of 40:1 to 100:1. In another embodiment, non-photosynthetic prokaryotes are mixed with photosynthetic eukaryotes and prokaryotes in ratios of 1:1 to 10,000:1, or any ratios therebetween, including, but not limited to, 1:10 to 8,000:1, 1:100 to 5,000:1, and 1:1,000 to 3,000:1. In a further embodiment, a microbe consortium comprises mixotrophy. In yet another embodiment, any commercially available or other auxiliary growing system can be deployed to supply specific non-photosynthetic prokaryotes or photosynthetic eukaryotes and prokaryotes to enrich the microbe consortium. The composition of the biomass can be configured to ensure that the proper levels of micronutrients are present to promote overall growth.

In a further embodiment, the modifications are compatible with established wastewater treatment practices. In one embodiment, carbon dioxide ($CO_2$) can be intermittently introduced into the wastewater treatment system (such as basins) to regulate pH for improving activity of other biologics in the processing of industrial waste. This introduction can improve and enhance the algae growth to consume the N, P, and S containing substances and to sequester metals and to reduce the level of total dissolved solids. The concentration of the $CO_2$ and other necessary agents can be adjusted for optimal operation. Another example is use of glycerin or other hydrocarbon feed to stimulate microbial remediation of wastewater, preferably during colder weather.

In one embodiment, the wastewater treatment system comprises a solids removal system that removes the airborne debris that is continually deposited in the wastewater. The removal of solids increases the efficiency of the recycle step and increases the conversion value of the biomass by lowering the inclusion of inorganic solids such as inert silica.

The recycling of solids can be employed for maintaining a variety of non-photosynthetic and photosynthetic prokaryotic and eukaryotic microbes comprising the microbe consortium including, but not limited to, *Acaryochloris, Amphora, Anabaena, Anacystis, Anikstrodesmis, Asteromonas, Azoarcus, Bacillus, Botryococcus, Chaetoceros, Chlorella, Chlorococcum, Closterium, Crocosphaera, Cyanotheca, Cyclotella, Cylindrotheca, Desmodesmus, Dunaliella, Escherichia, Euglena, Halobacterium, Halomonas, Halospirulina, Hematococcus, Isochrysis, Lyngbya, Marinichlorella, Micratinium, Microcystis, Monochrysis, Monoraphidium, Nannochloris, Nannochlorum, Nannochloropsis, Navicula, Nephrochloris, Nephroselmis, Nitrobacter, Nitrococcus, Nitrosococcus, Nitrosomonas, Nitrosopumilus, Nitrospina, Nitzschia, Nodularia, Nostoc, Oochromonas, Oocystis, Oscillatoria, Pavlova, Pediastrum, Phaeodactylum, Picochlorum, Platymonas, Pleurochrysis, Porphyra, Prochlorococcus, Pseudoanabaena, Pseudomonas, Pyramimonas, Rhodoceros, Rhodocyclus, Rhodomonas, Rubrivivax, Scenedesmus, Selenastrum, Spirulina, Stichococcus, Synechococcus, Synechocystis, Tetraselmis, Thalassiosira, Thermosynechocystis, Trichodesmium, Thiobacillus, Uronema,* and *Zoogloea.* Additional microbes comprising the microbe consortium include but are not limited to members of archaeabacteria (archaea) including haloarchaeal and thaumarchaeotal genera, and proteobacteria including betaproteobacteria.

The wastewater treatment systems and methods of the present invention can be used for the production of biomass concentrates and further extracts or processed matter suitable for a variety of purposes including, but not limited to, production of lipids, amino acids, polysaccharides, and hydrocarbons; as animal feed and human food; for the production of nutritional supplements and cosmetics; as chemical precursors for industrial applications; as raw materials for the production of biofuels, biodiesels, biogas, jet fuels, and electricity; and as biomaterials for removal of toxins, organic pollutants, and heavy metals from the water system.

BRIEF DESCRIPTION OF THE DRAWINGS

FIG. 1 shows one embodiment of the process flow using a wastewater basin (1). Inputs into the system can include plant utilities, such as electrical power and water (2). The wastewater system may comprise multiple basins in series or in parallel (3). Dewatering or stream purification, with processes involving concentration of biomass comprising microbial consortia, can be employed for solids enrichment via recycle of solids back into basins as indicated by arrows, and/or for solids recovery and removal purposes. Centrifugation, filtration, or other systems can be used in dewatering or stream purification, depending on the biomass utilized and/or the end products desired (4). Biomass processing methods include, but are not limited to, anaerobic digestion, hydro-treating, supercritical fluid extraction, and any combination thereof. The techniques used in biomass processing depend on various factors, such as, project economics, volumes, locations, and markets (5). Inorganic solids (non-hazardous) and/or hazardous organic solids can be disposed (6). Solid enrichment can be performed by addition of biologics as components of microbial consortia in the basins. Microbial consortia can comprise various microbe species, including, but not limited to, nitrifying prokaryotes, hydrocarbon degrading bacteria, metal sequestration microbes, and phototrophs, heterotrophs or mixotrophs, and eukaryotes (7). The treated or compositionally modified wastewater (cleansed aqueous waste) is ready for ultimate disposal (8). Mixing gases are introduced into the system. Mixed gases can be introduced into the system with micronutrients or microbe species (9). Some basins may require $CO_2$ addition to promote microbial growth (10). Economic products produced from the wastewater treatment system include, but are not limited to, fuel, protein supplement, specialty chemicals or intermediates (11). One or more solid removal apparatuses and/or processes (such as, for removal of inorganic solids) can be employed before wastewater treatment in the subsequent wastewater treatment basin(s) (12).

FIG. 2 shows one embodiment of pneumatic or compressed gas mixing for oxidation basins. In one embodiment, as shown in FIG. 2, the wastewater treatment system improves nutrient recovery and enhances microbial growing. In one embodiment, the wastewater treatment system comprises a wastewater basin (13), such as a basin with a length of 10 meters or greater and a width of 10 meters or greater; and a nozzle and impingement plate (14) within a zone (such as Zone A) (15). Each zone can pulse independently of the others. The zone area is a function of basin depth and basin geometry. Partial or complete mixing of wastewater may be performed in a basin. It also shows Zone A in section, with the nozzle and impingement plate and gas bubbles with upward and downward turbulence for mixing within a basin with depth such as about 1 meter or greater (16). FIG. 2 further shows the Process Functional Schematic (17) with compressed gas feeding into the nozzles controlled by a programmable logic controller (PLC) controller that determines how long and how often each control value stays open to allow gas passage. Factors to take into account are, for example, the basin depth, fluid viscosity and solids concentration. A typical system may have 5 to 30 zones; a zone can have multiple nozzles. These can be open for certain durations, such as fractions of a second for a 10-foot deep basin, or longer durations for deeper basins.

FIG. 3 shows an embodiment of a pneumatic or compressed gas mobile mixing and cleaning system, useful for large basins or systems with light nutrient recovery or for basins with specialized requirements. An oxidation basin can be thoroughly mixed (or made homogeneous) or partially mixed utilizing a portable or mobile mixing apparatus. The gas mobile mixing and cleaning system can be located within a wastewater treatment pond (18), comprising movable "arms" or extensions to allow the submerged nozzles and impingement plates to reach the proper depth for effective mixing (19); a defined grid or controlled movement pattern to allow mixing to occur in the needed locations facilitated by guides from dead-men or supports buried in the ground as an anchor (20); a control sequence to define when and how fast the movement is and how often the nozzles pump as programmed in the process building or housing (21); and a flexible air hose to the device for compressed gas (22). In one embodiment, these functional criteria can be satisfied using only compressed gas as the energy source. In one embodiment, the wastewater treatment system comprises an electric powered gas compressor and associated controls to be on land and the only "power" connection is a flexible compressed air conduit or hose.

DETAILED DESCRIPTION OF THE INVENTION

Definitions

Unless defined otherwise, all technical and scientific terms used herein have the meaning commonly understood by a person skilled in the art to which this invention belongs. As used herein, the following terms have the meanings ascribed to them unless specified otherwise.

The articles "a" and "an" are used herein to refer to one or to more than one (i.e., to at least one) of the grammatical object of the article. By way of example, "an element" means one element or more than one element.

The term "biomass" as used herein refers to a mass of living or biological material and includes both natural and processed, as well as natural organic materials more broadly.

The term "microbe consortium" as used herein refers to a biomass comprising more than one type of cell or organism such that a multiplicity of organisms is present together. In one embodiment of a microbe consortium, a eukaryotic alga is present with a prokaryotic alga (such as a chlorophyll-containing cyanobacterium), and with a non-photosynthetic prokaryote (such as a nitrifying bacterium). Additionally the composition of a microbe consortium can be supplemented in numbers by one or more added organisms. Microbes may include those that are colonial, filamentous, or benthic.

The term "culturing" as used herein refers to incubating a cell or organism or a plurality thereof under conditions wherein the cell or organism or plurality thereof can carry out some, if not all, biological processes. For example, a cell that is cultured may be growing or reproducing; or it may be non-viable, but still capable of carrying out biological and/or biochemical processes including, but not limited to, sequestration or storage of carbon, minerals and chemical elements, or transcription and translation.

The term "harvesting" as used herein refers to collection of cells or organisms from the liquid upon or in which a population of cells or microorganisms had grown, whereby the collection can be further processed (for example, composition analysis, extraction and/or conversion of biochemicals and/or cellular components).

The term "basins" as used herein includes ponds, containers, fluid collectors, pits, embankments, lagoons, tanks, and basins, such as for example, settling tanks, oxidation ponds, and post-oxidation basins. "Oxidation basin" is a general term referring to a specific volume of fluid undergoing some aeration, such as with use of pneumatic mixers or with surface bubblers. This volume is normally contained by erected walls or linings that can be made of metallic, polymeric, or native material that may or may not be porous to the media. The oxidation basins of the present invention include existing settling or post-oxidation basins re-purposed with added aeration to become oxidation basins.

The term "sedimentation" as used herein refers to separation of a suspension containing substances including, but not limited to, solid particles, cells, or microorganisms, into supernatant liquid and concentrated slurry.

The term "unicellular" as used herein refers to a prokaryotic or eukaryotic microorganism that spends at least some portion of its lifecycle as a unicellular organism.

The term "room temperature" as used herein refers to about 15° C.-45° C., or any temperature value therebetween, such as 20° C.-26° C.

The term "biologics" or "biologic" includes biologicals and any living or previously living microbial organism, whether natural, modified, or genetically engineered.

The present invention can be used to improve any wastewater treatment system by integrating the requirements for microbial biomass into a robust, functioning system. In one embodiment, the wastewater treatment method comprises a step of continuously agitating and efficiently mixing the active volume of wastewater in a basin such that solids contained in the wastewater are maintained in stable slurry, i.e., the solids are not allowed to settle. In one embodiment, the solids contained in the wastewater can be continuously removed and recycled, such as by commercially available equipment. This mixing process can also improve the kinetics and performance of the bioprocesses, including but not limited to photosynthetic activities of microorganisms during wastewater treatment process. Photosynthesis is a limiting step for algae growth in deep, still ponds, where the nuisance nutrients such as N-, P-, and/or S-containing compounds are converted into, and recovered as, solid biomass. This biomass can be handled along with the airborne debris and disposed of properly. The present invention provides continuous and robust wastewater operations that seldom need to be shut down for performing maintenance functions.

Microbes as biologicals are well-established components of wastewater operations. Prokaryotes perform numerous roles in recycling nutrients and may be aerobic, anaerobic, or facultative aerobes. Bacteria break down organic matter into carbon dioxide ($CO_2$) and water, and cycle nutrients such as N, S, and P. Nitrifying bacteria, for example, can oxidize nitrite and total ammonia nitrogen into nitrate. Biologic agents can be added for various purposes, such as, for removal of hydrocarbons or metals. Many bacteria are tolerant of high salinities and pH in certain wastewater operations. The addition of oxygen during wastewater treatment is practiced to improve the functioning and proliferation of aerobic bacteria. Use of agitation and control of pH can be practiced to enable efficient reduction of organics in the wastewater. Such conditions favorable to bacteria also promote growth of photosynthetic prokaryotes and eukaryotes, including, but not limited to, cyanobacteria and microalgae. In one embodiment, cyanobacteria and microalgae form consortia that cleanse wastewater.

Algae that are scalable for production have become increasingly useful for wastewater treatment purposes. Algae can be used for the passive removal of toxins, organic pollutants, and heavy metals from a water system. Due to the presence of carbohydrates and fats, algae biomass serves as a promising source of clean and renewable energy, for example, as raw materials for the production of biofuels (such as via pyrolysis, solvent extraction, or supercritical solvent treatment) or biogas (via microbial fermentation).

In one embodiment, the present invention provides a method of treating wastewater, comprising: providing a basin for receiving wastewater; and mixing wastewater in the basin.

In one embodiment, the step of mixing wastewater in the basin comprises: generating lateral turbulence in the basin. In one embodiment, the step of mixing wastewater in the basin comprises: generating turbulence from the bottom of the basin to the top of the basin; and/or generating turbulence from the top of the basin to the bottom of the basin. In one embodiment, the step of mixing wastewater in the basin comprises: generating turbulence towards various different directions, or towards all directions in the basin.

In one embodiment, the wastewater treatment method comprises: introducing compressed gas into the basin to generate turbulence, thereby mixing wastewater contained in the basin. The compressed gas can be introduced into the basin from any depth of the basin including, but not limited to, at or near the top of the basin, at or near the center of the basin, and at or near the bottom of the basin.

In one specific embodiment, the wastewater treatment method comprises: introducing compressed gas into the basin, wherein the compressed gas is released from a position at or near the bottom of the basin.

In one embodiment, the compressed gas is introduced from a position having a depth of deeper than 70% (or any depth deeper than 70%, including, but not limited to, deeper than 80%, 90%, 95%) of the entire depth of the basin.

In one embodiment, a compressed gas released into the basin comprises $CO_2$, $O_2$, or $N_2$, or any combination thereof. In another embodiment, compressed gas released into the basin does not comprise $CO_2$.

In certain embodiments, a compressed gas stream released into the basin has a pressure of 0.1 to 100.0 bar absolute, or any pressure therebetween, including but not limited to, 1.1 to 30.0 bar absolute, and 5.0 to 10.0 bar absolute. The actual level of compression needed may be achieved by any means known in the art, such as by utilizing a compressor.

In addition, while the term "a compressor" is utilized, the degree of compression may also be achieved by utilizing more than one compressor (multiple compressors in series). In certain embodiments, compression can be isothermal (several stages with inter-stage cooling) or adiabatic (no or less inter-stage cooling but heat recovery of the heat from the hot pressurized gas stream in a steam cycle).

In one embodiment, the compressed gas is introduced, and/or released from any position in the basin, including, but not limited to, any position of about 10%, 20%, 30%, 40%, 50%, 60%, 70%, 80%, 90%, or 100% of the entire depth of the basin.

The term "near the top of the basin" encompasses any position, inside the basin, of no more than 30% of the entire depth of the basin. The term "near bottom of the basin" encompasses any position, inside the basin, of more than 70% of the entire depth of the basin. The term "near center of the basin" encompasses any position, inside the basin, of a depth from 30% to 70% of the entire depth of the basin.

In one embodiment, the entire volume of wastewater in the basin is mixed. In certain embodiments, part of the entire volume of wastewater in the basin, such as 10%, 20%, 30%, 40%, 50%, 60%, 70%, 80%, or 90% of the entire volume of wastewater in the basin, is mixed. In one embodiment, the treatment method comprises continuously and/or intermittently mixing wastewater in the basin.

In one specific embodiment, the wastewater treatment method comprises:
  providing a basin for receiving wastewater;
  introducing wastewater into the basin;
  mixing the wastewater in the basin, wherein the mixing step comprises generating turbulence from the bottom of the basin to the top of the basin;
  maintaining, in the basin, a microbial consortium comprising a population of microorganisms that consume one or more N-, P-, or S-containing substances; and
  discharging the wastewater.

In another embodiment, the wastewater treatment method further comprises maintaining, in the basin, a microbial consortium comprising a population of microorganisms. In one embodiment, the microbial consortium comprises one or more species of microorganisms including, but not limited to, nitrifying prokaryotes, hydrocarbon degrading bacteria, metal sequestration microbes, phototrophs, heterotrophs, and mixotrophs. In another embodiment, the wastewater treatment method comprises recycling one or more species of microorganisms contained in the wastewater, and re-introducing the recycled microorganisms into the basin.

In one further embodiment, the wastewater treatment method further comprises: removing solids from the wastewater before the wastewater is discharged from the tank.

In one embodiment, the present invention provides utilization of a wastewater basin system for modifying the composition of wastewater, comprising: submerged mixing within the basin; solid enrichment in the system to maintain a microbe consortium in situ; and removal of excess solids from the system. In one embodiment, the wastewater treatment systems and processes of the present invention are compatible with existing wastewater treatment system conditions and practices.

In one embodiment, the wastewater basin system has inflow of no less than 300 gal/min and/or a hydraulic residence time of no less than 3 days. In another embodiment, the inflow was less than 300 gal/min, less than 250 gal/min, less than 200 gal/min, less than 150 gal/min) In one embodiment, the mixing step comprises introducing compressed gas into the wastewater basin.

In one embodiment, the microbe consortium in the basin (in situ) comprises suspended solids in excess of 0.009 g/L, preferably at 0.05 g/L or even at 0.1 g/L or higher. In one embodiment, the microbe consortium comprises non-photosynthetic prokaryotes mixed with photosynthetic eukaryotes and prokaryotes in ratios of from 1:1 to 10,000:1. In one embodiment, the microbe consortium is tolerant of wastewater N:P ratios in excess of 10:1, preferably of 40:1 to 100:1.

In one embodiment, the microbe consortium comprises mixotrophs. In one embodiment, the microbe consortium can consume toxins, organic contaminants, and/or heavy metals. In certain embodiments, the microbe consortium comprises one or more species including, but not limited to, *Acaryochloris, Amphora, Anabaena, Anacystis, Anikstrodesmis, Asteromonas, Azoarcus, Bacillus, Botryococcus, Chaetoceros, Chlorella, Chlorococcum, Closterium, Crocosphaera, Cyanotheca, Cyclotella, Cylindrotheca, Desmodesmus, Dunaliella, Escherichia, Euglena, Halobacterium, Halomonas, Halospirulina, Hematococcus, Isochrysis, Lyngbya, Marinichlorella, Micratinium, Microcystis, Monochrysis, Monoraphidium, Nannochloris, Nannochlorum, Nannochloropsis, Navicula, Nephrochloris, Nephroselmis, Nitrobacter, Nitrococcus, Nitrosococcus, Nitrosomonas, Nitrosopumilus, Nitrospina, Nitzschia, Nodularia, Nostoc, Oochromonas, Oocystis, Oscillatoria, Pavlova, Pediastrum, Phaeodactylum, Picochlorum, Platymonas, Pleurochrysis, Porphyra, Prochlorococcus, Pseudoanabaena, Pseudomonas, Pyramimonas, Rhodoceros, Rhodocyclus, Rhodomonas, Rubrivivax, Scenedesmus, Selenastrum, Spirulina, Stichococcus, Synechococcus, Synechocystis, Tetraselmis, Thalassiosira, Thermosynechocystis, Trichodesmium, Thiobacillus, Uronema,* and *Zoogloea*.

In one embodiment, the wastewater treatment method comprises: adding a microorganism used in remediation; and, optionally,
  proliferating the microorganism using a hydrocarbon source, for example, glycerin; and, optionally,
  intermittently injecting $CO_2$ or bicarbonate into the basin.

In certain embodiments, the wastewater treatment method is performed at temperatures from −40° C. to 60° C., or any temperatures therebetween including, but not limited to, from −30° C. to 50° C., from −20° C. to 40° C., 0° C. to 30° C., etc.

In certain embodiments, the wastewater treatment method is performed at a temperature of less than 20° C., or any temperature less than 20° C. at which some portion of the wastewater remains liquid, including, but not limited to, less than 15° C., less than 12° C., less than 10° C., less than 8° C., less than 5° C., less than 0° C., and less than −5° C.

In one embodiment, the wastewater treatment method comprises: adding viable microorganisms and/or non-viable solids into the basin. In one embodiment, the wastewater treatment method comprises recycling of in situ solids into the wastewater treatment system. In one embodiment, the wastewater treatment system comprises removing inorganic solids from the wastewater.

In one embodiment, the wastewater treatment system comprises recovering nutrients, including, but not limited to, nitrogen, carbon, phosphorous, and sulfur, from the wastewater; and optionally, remediation of wastewater. In one embodiment, the wastewater treatment basin receives wastewater from the energy, petroleum, or petrochemical industries.

In one embodiment, the wastewater treatment system further comprises: producing biomass from the microbe consortium. Also provided is biomass produced from the wastewater treatment method. In another embodiment, the present invention provides bioenergy generated by or derived from the biomass produced from the wastewater treatment process.

In another embodiment, the present invention provides a wastewater treatment system comprising: a wastewater treatment basin comprising an inlet for receiving wastewater and an outlet for discharging wastewater; and a compressed gas source capable of releasing compressed gas into the basin.

In one embodiment, the wastewater treatment system comprises a compressed gas source for releasing compressed gas into the basin. In one embodiment, the compressed gas source is located inside the basin. In another embodiment, the compressed gas source has an outlet functionally connected to the basin, thereby releasing compressed gas into the basin.

In one embodiment, the wastewater treatment system comprises a gas container/tank located inside the basin, wherein the gas container/tank contains compressed gas that can be released into the basin. In another embodiment, the wastewater treatment system comprises a nozzle capable of releasing compressed gas into the basin. In one embodiment, the nozzle capable of releasing compressed gas into the basin is located near the bottom of the basin. In one embodiment, the wastewater treatment basin comprises a fluid mixer, such as a pulsed air mixer.

In one embodiment, the wastewater treatment system comprises a microbe consortium. In one embodiment, the microbe consortium can consume toxins, organic contaminants, and/or heavy metals. In certain embodiments, the microbe consortium comprises one or more species including, but not limited to, *Acaryochloris, Amphora, Anabaena, Anacystis, Anikstrodesmis, Asteromonas, Azoarcus, Bacillus, Botryococcus, Chaetoceros, Chlorella, Chlorococcum, Closterium, Crocosphaera, Cyanotheca, Cyclotella, Cylindrotheca, Desmodesmus, Dunaliella, Escherichia, Euglena, Halobacterium, Halomonas, Halospirulina, Hematococcus, Isochrysis, Lyngbya, Marinichlorella, Micratinium, Microcystis, Monochrysis, Monoraphidium, Nannochloris, Nannochlorum, Nannochloropsis, Navicula, Nephrochloris, Nephroselmis, Nitrobacter, Nitrococcus, Nitrosococcus, Nitrosomonas, Nitrosopumilus, Nitrospina, Nitzschia, Nodularia, Nostoc, Oochromonas, Oocystis, Oscillatoria, Pavlova, Pediastrum, Phaeodactylum, Picochlorum, Platymonas, Pleurochrysis, Porphyra, Prochlorococcus, Pseudoanabaena, Pseudomonas, Pyramimonas, Rhodoceros, Rhodocyclus, Rhodomonas, Rubrivivax, Scenedesmus, Selenastrum, Spirulina, Stichococcus, Synechococcus, Synechocystis, Tetraselmis, Thalassiosira, Thermosynechocystis, Trichodesmium, Thiobacillus, Uronema*, and *Zoogloea*.

In one embodiment, the wastewater treatment basin comprises an inlet for introducing biologics into the basin.

In one embodiment, the wastewater treatment system further comprises a dewatering system functionally connected to the basin, and is configured to receive wastewater discharged from the basin. Dewatering systems useful according to the present invention include, but are not limited to, plate and frame filters, centrifugation, rotary drum vacuum filters, belt filters, hybrid systems, and any combinations thereof. In one embodiment, the dewatering system is located downstream of the wastewater treatment basin.

Wastewater Treatment Systems

Individual wastewater treatment systems are unique for the following reasons: 1) The initial required functions play an important role in their design and construction; 2) Local geography and environment that act as the drivers or systems can be effectively utilized; and 3) Ever changing regulations that dictate through non-compliance regulatory limits that define the required performance. Governmental regulations often bring mandatory changes to performance criteria and limits. Currently, the N and P levels in the final treated effluent need to meet governmental regulations.

In one embodiment, the present invention improves existing wastewater treatment systems by reducing the levels of N-, P-, and/or S-containing compounds, metals, total solids, and/or other contaminants in the effluent. The wastewater treatment system and method of the present invention convert N-, P-, S-containing compounds, metals, total solids and/or other contaminants into compounds, compositions, and/or biomasses that can be captured by commercially available systems or unit operations.

Further, this invention applies not only to currently existing wastewater infrastructure but also to future added or upgraded basins, in series or in parallel with existing infrastructure, or as part of system upgrades for an operation, or to intermediate process structures. For example, many municipalities are undergoing massive renovations, expansions, and even relocations or re-situating of activities for which this invention can be practiced. As another example, intermediate structures in the hydraulic fracturing process can be employed to treat wastewater prior to injection for disposal.

While this invention enables compositional modification of wastewater in an active wastewater basin system, such as having inflow at or exceeding 300 gal/min and hydraulic residence time at or exceeding 3 days, this can be applied to lagoons as well with lower inflow rates and much longer residence time, or to other systems with higher inflow rates and also relatively longer residence times.

The systems and methods of the invention are compatible with operation, in series or in parallel, of anaerobic systems for special purposes, as is known in the art in water quality management to supplement the aerobic treatment. For example a portion of the basin or a separate basin lacking mixing can allow proliferation of Methanobacterium, Methanomethylovorans, Methanolobus, and Thermococcus, Halanaerobium, and other anaerobic archaea or other microbes.

The wastewater to be treated can be considered upstream or downstream in an industrial operation. Using the oil industry as an example, the invention can be applied to upstream processes generating produced water and flow-back in tight oil and shale gas production as well as to downstream processes after further processing of the oil.

The systems and methods of the invention are further compatible with physical and chemical methods used in wastewater treatment.

In one embodiment, the wastewater treatment system and/or process comprises one or more of the following steps or operations:

1. Collection;
2. Pretreatment;
3. Biological treatment where naturally occurring species are used to consume the organic materials;
4. Final Polishing;
5. Solids Removal; and
6. Ultimate Release.

Collection

In one embodiment, the wastewater treatment systems receive liquid streams, of varying compositions, which are collected in a central location. This location, which is normally a surge volume, allows the "peaks and valleys" of the flows to be normalized and transmitted for further treatment at a controlled and tolerable design flow rate.

In one embodiment, if solids fall-out is a problem, pulsed gas mixing can be applied to wastewater contained in wastewater treatment basins to allow removal of solids prior to further processing steps.

Pretreatment

Often, industrial (and to a lesser extent municipal,) wastewater treatment systems, require removal of unique or particularly obnoxious substances prior to further conventional treatment. In one embodiment, the wastewater is treated to remove such hazardous/toxic substances including, but not limited to, heavy metals, carcinogens, toxins or other noxious materials associated with a specific industrial operation.

Such pretreatments are normally handled by wet chemistry or other techniques known in the art or developed by the industrial facility operator. In one embodiment of the subject invention, the wastewater is mixed using pulsed gas to facilitate pretreatment removal of toxic/hazardous substances.

Biological Treatment

In one embodiment, the wastewater treatment systems comprise one or more species of bacteria, algae and/or other living microorganisms for converting organic wastes into water and benign gases, such as nitrogen and carbon dioxide. In one embodiment, the biologics are used in treating wastewater containing petrochemical and refinery waste, for removing oil deposits, for enhancing organic removal efficiency, for improving cold weather operations, and/or for suppressing growth of filamentous microbes. In one embodiment, the wastewater treatment basin has a pH of 5.5 to 8.5, or any pH therebetween, including, but not limited to, 6.5 to 7.5. In certain embodiments, the $CO_2$ gas is continuously or intermittently injected into the wastewater treatment basin.

In certain embodiments, the present invention offers one or more of the following advantages.

In one embodiment, the wastewater treatment system and method of the present invention offers significant improvement of the functional basin depth so that microbes are able to prosper. Algae and cyanobacteria, for example, require sunlight, nutrients, and $CO_2$ to grow and multiply. Other microbes require access to organic carbons. In one embodiment, the wastewater treatment basin of the present invention comprises a pulsed gas mixing system that allows a more homogenous volume in which microorganisms can access sunlight, oxygen, and/or nutrients. In one embodiment, part of the wastewater contained in the basin is mixed.

In one embodiment, the wastewater treatment system and method of the present invention results in minimal solids deposition in the biologic basins. The efficient mixing keeps the solids in suspension so that solids can be efficiently removed.

Microbial solids enrichment operation (such as via growing, recycling and replenishment operations) ensures that an effective amount of one or more microbe species are present in the wastewater in sufficient concentrations to allow effective conversion of N-, S-, and/or P-containing compounds to biomass, and to capture of contaminants, which can be removed and used if suitable for other, potentially valuable, uses.

Final Polishing

This step in the waste treatment system is associated with the final clean up prior to ultimate release. Typically this function focuses on solids removal, as most biological and chemical operations have been completed in previous steps.

In one embodiment, the invention employs cross-flow filtration in the final clean up step. The use of cross-flow filtration provides a gentle yet thorough clean up step that allows the biomass to be returned to the previous steps for further enrichment and additional waste capture/conversion; that allows concentrated slipstream of this filtration process to be diverted for economic conversion of the biomass to valuable co-products (such as fuels); and allows that the stream to act as the system "kidney," such that the biomass can exit the system in a planned, controlled manner. In one embodiment, the cross-flow filtration process is performed at a solids level that minimizes maintenance of membranes, such as a solids level below 0.1 g/L.

Solids Removal

Typically wastewater treatment systems have multiple treatment volumes/basins in series. The use of pulsed compressed gas for mixing the contents of these basins keeps the solids in suspension. The airborne grit or sand can be easily removed between basins because of the high relative specific gravity (relative to the biomass). The biomass has potential value and can be further concentrated and later removed for sale or additional processing.

Ultimate Release

This is the final destination of the wastewater treatment system effluent. It is likely limited in volume (rate of flow), multiple species concentrations, temperature, and probably pH.

The invention allows periodic measurement and adjustment of these variables in various processing steps. It also permits adjustment or fine-tuning of the biologic activity by changing both the microbe concentration and micronutrient levels.

Microbe Consortium

Microbe consortia employed by the novel methods taught herein can be natural, mutants, variants, genetically adapted, or genetically engineered.

The present invention describes managing the consortium composition to reflect the preferred ratios of photosynthetic to non-photosynthetic microbes by producing biomass in photobioreactors or ponds, followed by partial or no dewatering of said biomass prior to mixing with the existing microbe consortium in the basin. The step serves to reduce risk by providing an unlimited and consistent biologically active microbe consortium. The enrichment of photosynthetic species of the microbial consortia of the present invention can pertain to polycultures or predominantly monocultures of a variety of algae species including, but not limited to, *Acaryochloris, Amphora, Anabaena, Anacystis, Anikstrodesmis, Botryococcus, Chaetoceros, Chlorella, Chlorococcum, Closterium, Crocosphaera, Cyanotheca, Cyclotella, Cylindrotheca, Desmodesmus, Dunaliella, Euglena, Halospirulina, Haematococcus, Isochrysis, Lyngbya, Marinichlorella, Micratinium, Microcystis, Monochrysis, Monoraphidium, Nannochloris, Nannochloropsis, Navicula, Nephrochloris, Nephroselmis, Nitzschia, Nodularia, Nostoc, Oochromonas, Oocystis, Oscillatoria, Pavlova, Pediastrum, Phaeodactylum, Picochlorum, Platymonas, Pleurochrysis, Porphyra, Prochlorococcus, Pseudoanabaena, Pyramimonas, Rhodoceros, Rhodomonas, Scenedesmus, Selenastrum, Spirulina Stichococcus, Synechococcus, Synechocystis, Tetraselmis, Thalassiosira, Thermosynechocystis, Trichodesmium,* and *Uronema.*

Some of these species can also function in mixotrophic mode. One specific embodiment is given for several species. Further, some non-photosynthetic prokaryotes or photosynthetic bacteria and proteobacteria can include *Asteromonas, Azoarcus, Bacillus, Escherichia, Halobacterium, Halomonas, Nitrobacter, Nitrococcus, Nitrosococcus, Nitrosomonas, Nitrosopumilus, Nitrospina, Rhodocyclus, Rubrivivax, Thiobacillus,* or *Zoogloea.*

Microbes that synthesize exopolysaccharides (EPS), with or without the presence of added carbon, are known to enhance the reduction activity of heavy metal concentrations. One specific embodiment is given for the anionic, sulphate-rich or uronic acid-rich exopolysaccharides synthesized by *Haloferax* or *Rhodoceros*. EPS synthesized by these or other microorganisms can enable these microbes to bind and remove heavy metals from solutions. This microbial feature offers natural biopolymers as biosorbents to complement physical and chemical methods. For example they can serve in a final finishing treatment of the polluted hyposaline or hypersaline wastewater.

Microbe Culture Techniques

In various embodiments, marine and freshwater microbial consortia can be enriched for microalgae that can be initially grown in a variety of media and growth conditions as are known in the art (Andersen, R. A. ed., *Algal Culturing Techniques*, Phycological Society of America, Elsevier Academic Press; 2005). For example, in various embodiments, the algae may be grown in medium containing about Guillard's F/2 salts at about room temperature (such as 20° C.-25° C.) or at outdoor ambient temperature (such as 25° C.-38° C.). Consortia can be enriched for prokaryotes in a variety of media and growth conditions as are known in the art. For example, archaea may be grown in medium containing NaCl (175 g/L), $MgCl_2.6H_2O$ (50 g/L), $K_2SO_4$ (5 g/L), $CaCl_2.2H_2O$ (0.1 g/L), yeast extract (Difco) (5 g/L), agar (20 g/L), pH 7.0-7.2.

In some embodiments, cells can be grown under illumination with bright white and warm fluorescent lights (for example, about 80 to 200 umol/$m^{2-}$ sec or even to 400 umol/$m^{2-}$ sec) with, for example, about a 12-hour light: 12-hour dark photoperiod, a 14-hour light: 10-hour dark photoperiod, or a 16-hour light: 8-hour dark period. In some embodiments, cells can be grown under natural illumination with or without shading in bioreactors or open culture systems such as raceway or other ponds. In some embodiments, carbon is added as desired, such as 0.1 to 5% glucose or molasses. In some embodiments, high-density cultures produced under fermentation can be delivered to the site for mobile treatment of wastewater basins.

The volume of growth medium may vary. In some embodiments, the volume of media can be between about 1 L to about 100 L. In some embodiments, the volume is between about 1 L to about 10 L. In some embodiments, the volume is about 4 L. In some embodiments, cell growth is monitored in liquid culture by employing culture tubes, vertical or horizontal culture flasks or larger volume carboys. In some embodiments in outdoor culture, volumes are generally 100 to 600 L, or in larger increments, such as 1200 L, 2400 L or 20,000 L in bioreactors, including enclosed ponds. In some embodiments non-photosynthesizing cultures are grown in the dark in closed reactors.

In some embodiments, cells can be collected for assessment of concentration. Lugol's staining, as is known in the art, is used for cell counts using a hemacytometer or cell counter. Alternatively, flow cytometry or spectrophotometry can be used, given an appropriate standard curve.

For growth of the microbes in the basin themselves, and in certain wastewaters, the carbon:nitrogen ratio is controlled adjusting molasses and other carbon-rich inputs. In some embodiments, the carbon directly, or indirectly after breakdown, feeds heterotrophic and facultative prokaryotes and eukaryotes and can also enhance the biosorption capacity of metal ions via exopolysaccharide formation by the microbes.

Uses of Biomass

The novel methods and process results in biomass with a variety of uses including, but not limited to, as chemical precursors for industrial applications; as raw materials for the production of biofuels, biodiesels, jet fuels, biogas, and electricity; as physical mass for soil conditioning; and as biomaterials for removal of toxins, organic pollutants, and heavy metals from the water system.

For example, unsaturated hydrocarbons such as C18:2 or C18:3, are useful for chemical applications due to the presence of double bonds. These can be chemically treated as is known in the art to convert the double bonds of fatty acids into hydroxyl groups, and the resulting polyols can be mixed with compounds such as isocyanate to form polyurethanes. As already demonstrated by Soyol, these renewable, sustainable alternatives to petroleum-derived polyurethane have excellent physical characteristics and are well-suited for a variety of applications, such as rigid foams, spray insulating foams, flexible foams such as interior car parts, coatings, sealants, elastomers, and adhesives.

In one specific embodiment, the biomass can be used for production of biofuels. In addition, the residuals of a conversion or extraction process can serve as soil conditioners or nutrients for further biological processes.

EXAMPLES

The following examples are provided to describe the invention in further detail. These examples serve as illustrations and are not intended to limit the invention.

Example 1

Basin Mixing

Existing oxidation basins typically have a design depth of 1 meter or more. This depth allows extended reaction or stay-time in the volume to accomplish waste material conversion to innocuous products (primarily carbon dioxide and water). Using photosynthetic microbes in the existing oxidation basins provide limited benefits because the conditions favorable to algae growth only occur at a small volume proximate to the basin surface.

This Example teaches the introduction of mixing to essentially make the entire depth available for microbial growth because of the "bottom-up" circulation for the gas buoyancy. This concept can be used for nearly all basins because of the system's flexibility regarding basin geometric shape and depth. This includes post-oxidation ponds, settling ponds, and intermediate holding pits for flowback or produced water. Mixing can be implemented for example through use of compressed gas.

Further, this invention applies not only to currently existing wastewater infrastructure but also to future added or upgraded basins, in series or in parallel with existing infrastructure, or as part of system upgrades for an operation, or to intermediate process structures. For example, many municipalities are undergoing massive renovations, expansions and even relocations or re-situating of activities for which this invention—by logical extension—can be practiced. As another example, intermediate structures are being employed upstream to treat fracturing fluid and produced wastewater prior to injection for disposal.

Figure 2:
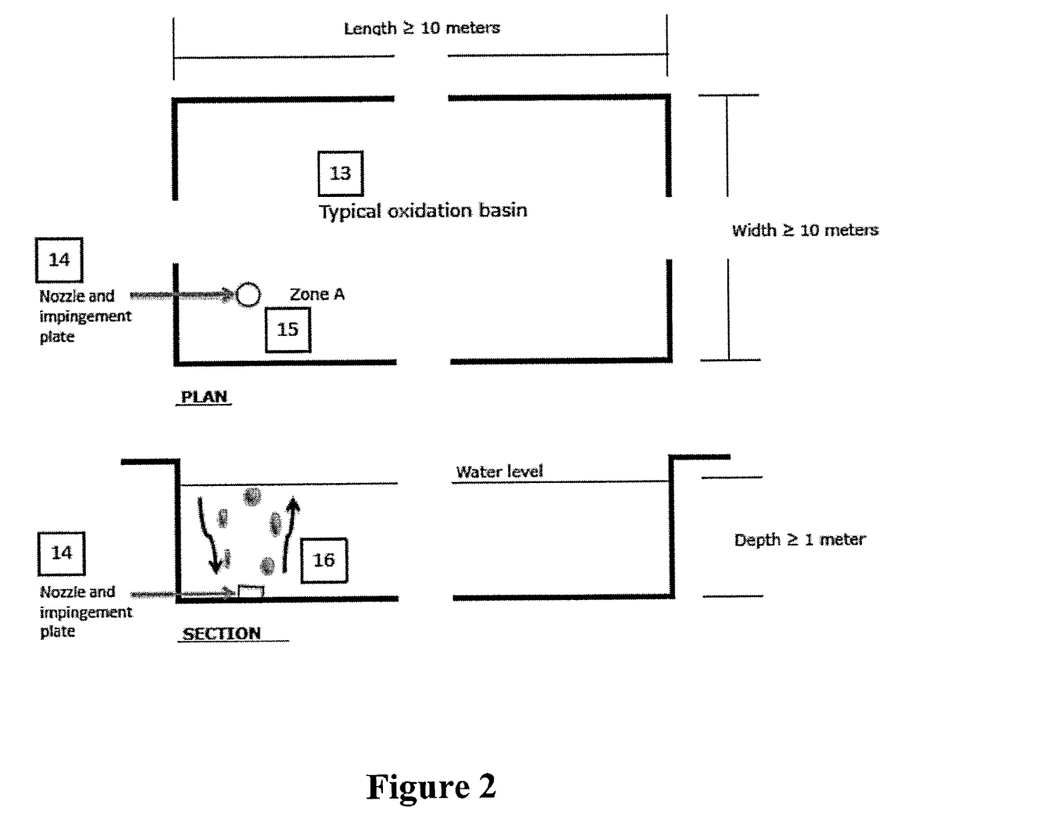

Gas composition can be modified to include micronutrients or materials conducive to enhance algae growth. One embodiment of a schematic of a mixing system is included as FIG. 2. Another embodiment of a schematic of a mixing system is included as FIG. 3.

An oxidation basin, or any other liquid container, is efficiently mixed using pulsed bursts of compressed gas, which strikes an impingement plate above a submerged nozzle that divides the pulse into all four lateral directions. The pulse further divides into large bubbles because of the fluids (both gas and media) surface tension. These bubbles rapidly rise to the surface. The rising action results in thorough mixing of the media because of the induced circular motion. The degree of mixing or media basin homogeneity can be controlled by the pulse frequency and duration. This allows effective conversion of the entire basin depth to favorable microbe growing conditions (for photosynthetic biologicals, each has an equal chance to be exposed to the sunlight). The efficiency of this mixing process requires less than 10% of the mechanical energy expenditure for equivalent media homogeneity if surface aerators are utilized. Pulsed gas mixing of the algae growing media significantly improves the observed reaction kinetics by a factor of 3. The wastewater treatment system of the present invention keeps the solids in suspension, thereby producing a dramatic overall improvement in system performance. Large basins could utilize a portable or mobile mixer as referenced in FIG. 3.

Figure 3:
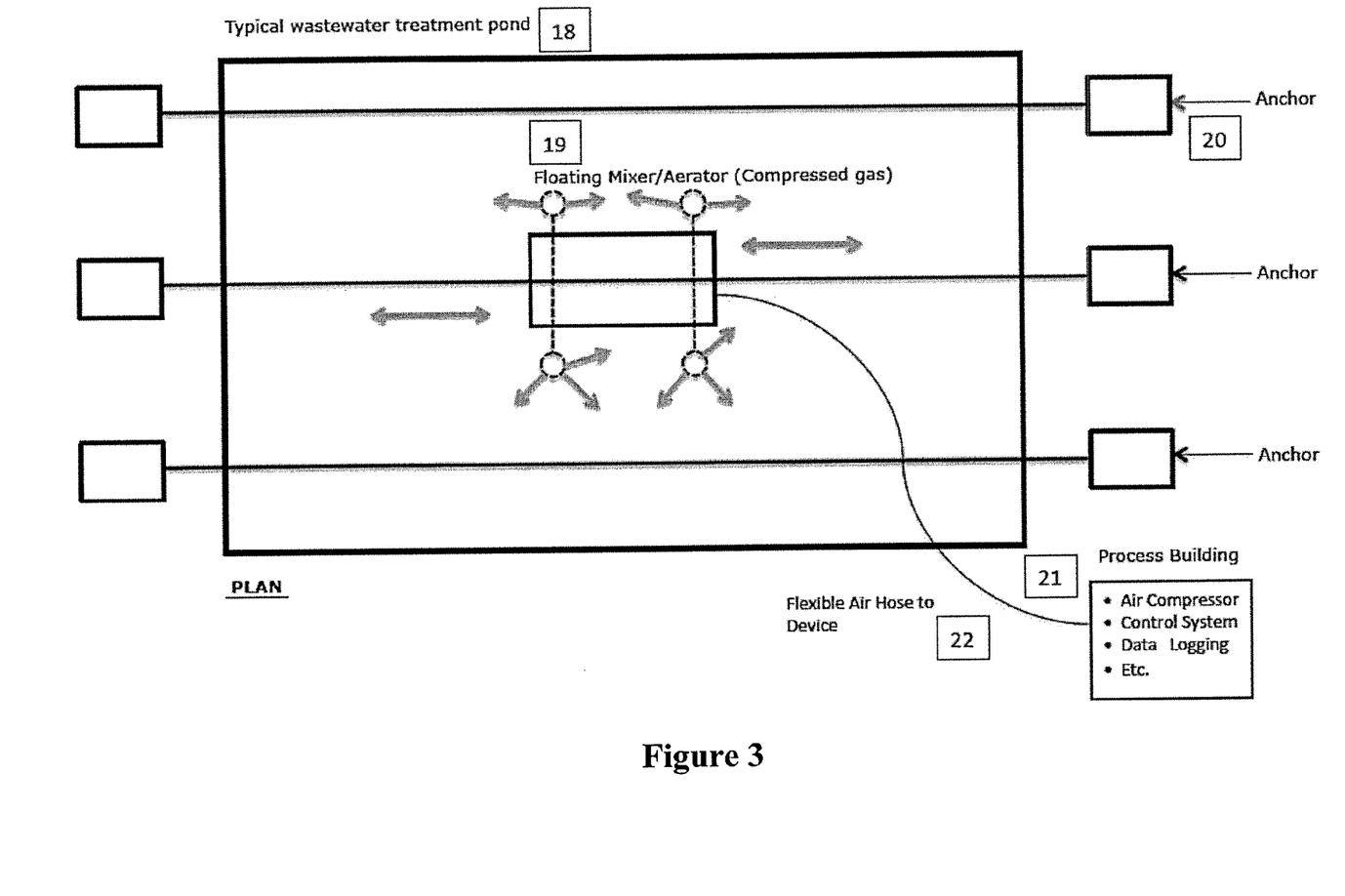

This concept is particularly attractive where solids accumulation is minimal, requiring only partial basin mixing and is shown schematically in the referenced FIG. 3. The system can be fabricated from corrosion resistant materials. The floating platform can be moved by compressed air driven motor. It has a surge volume aboard, such as for 10 to 20 cubic feet, to minimize line size. The only direct connection to the perimeter ground is a flexible air hose. It can be moved periodically for basin maintenance or cleaning purposes. The operation can include a micro-bubble diffuser for better gas transfer.

Aerators can be positioned predominantly in one region of the basin and not in another region to enable solids settling in a portion of the basin. Settling allows concentration and removal of excess solid waste via one or more foci for draining, siphoning, or other outflow.

Basin mixing can occur under conditions in which the wastewater temperature is regulated such as by the use of waste heat and surface covers—including retractable or fixed plastic sheeting. Covers also block rainfall from the basins for better control of the water chemistry; similarly massive covering for control of water basin conditions is taught in aquaculture systems. Under low light conditions, such as under prolonged cloud cover or during nighttime, additional organic substrate is introduced and mixed to support continued biomass proliferation and exopolysaccharide formation.

Example 2

Solids Enrichment: Recycle of Solids

This Example describes using a dewatering system to recycle viable microbe consortia from the wastewater system without the use of flocculants, which can render the biomass non-viable and are damaging to ecosystems. The dewatering system also recycles non-viable solids that can still perform remediation functions such as adsorption of metals. The microbial solids can be returned to the basin to maintain desired levels of suspended solids. The level of suspended solids can be adjusted for any desired level of nutrient recovery or compositional modification (such as remediation) or for seasonal effects on operation. Dewatering systems useful according to the present invention include, but are not limited to, plate and frame filters, centrifugation, rotary drum vacuum filters, belt filters, hybrid systems, and any combinations thereof. In one embodiment, some continuous centrifugation technologies that enable dewatering of still viable cells are of value for recycling of viable solids; they also can enrich for heavier and larger eukaryotes over prokaryotes.

In one embodiment, the dewatering system uses crossflow filtration, also referred to as hollow fiber filtration (HFF).

Crossflow Filtration is designed to process fluid streams with finely divided solids in dilute concentrations. The effluent (permeate) is nearly pure because of the fine filtration and readily lends itself to recycle or to an appropriate outflow stream combined with other system outflow; the effluent can also be reserved for back flushing of filters. In general, a maximum concentration factor per filter stage occurs, otherwise the flux through the filter media is high enough to "trap" the solids and form a cake requiring difficult system cleaning. If this is the case, filters in series are used to meet certain concentration demands. These systems can be modified and adapted to process microalgae-rich microbial biomass.

At one scale, three units in parallel with a total of 15 square meters of commercially available 0.1 micron membrane area cartridges are coupled with stainless steel piping and Schedule 80 PVC piping with a sanitary rotary positive displacement pump with 4" tri-clamp inlet/outlet, 138 gpm driven by a 10 hp 3 phase 460V, 1730 rpm gear motor, and a motor control panel using a variable-frequency drive. The average permeate flux rates are 30 Liters per square Meter per Hour (LMH), indicating that, for example, 67 square meters of membrane area is required for the 25,000 L unit volumes as an example. The target HFF final hold-up volume is 62.5 liters or less to allow for flexibility in harvest volumes. Similarly, at a volume of 75,000 L, the dewatering system requires a permeate flux rate of 37,500 liter per 6 hours or 6,250 liters per hour. The permeate flux rate corresponds to a requirement of 208 square meters of membrane area, and can be adjusted depending on operating densities. For 37,500 liters harvested at a cell density of 0.5 grams per liter, the required HFF final hold-up volume is 187.5 liter or less to achieve a final recycled biomass concentrate for example. A totalizer measures the volume of culture being drawn into the dewatering system and shuts off after a specified volume based on hold-up volume and desired cell density.

The effect on the HFF system design is that the final hold-up volume is as small as possible to allow for flexibility in harvest volumes. Maintaining 4-6 trans-membrane pressures, for example, allows the dewatering cycle to operate efficiently at one scale. Permeate pressure is at least 5 psi and retentate pressure is between 5-8 psi. Operationally, closing the permeate valves for 3 minutes every hour for some applications helps clear debris off the fiber surfaces.

The recycled biomass must retain a large number of cells, with an emphasis on the algae viability for nutrient recovery. Viability is monitored as needed microscopically by presence of intact algae cells showing dye exclusion, natural chlorophyll fluorescence, or other viability tests such as fluorescence using FDA for intact algae cells. In other applications such as metals adsorption, viability is not necessarily required and the recycled solids need not be viable.

Example 3

Microbe Culture Techniques for Enrichment of Viable Solids

This Example illustrates various microbe culture techniques for producing a preferred or dominant composition of the microbe consortium and/or for enriching viable solids for nutrient recovery. Microorganisms are isolated from water samples taken from the wastewater site or obtained from collections. Basal media vary as is known in the art for Archaea, Proteobacteria, bacteria, cyanobacteria, and numerous eukaryotic microbes on fresh water, saline, or hypersaline media. For example, salt-tolerant archaea can be grown in medium containing NaCl (175 g/L), $MgCl_2.6H_2O$ (50 g/L), $K_2SO_4$ (5 g/L), $CaCl_2.2H_2O$ (0.1 g/L), yeast extract (Difco) (5 g/L), agar (20 g/L), pH 7.0-7.2. Carbon is added as desired, such as 0.1 to 5% glucose or molasses. In other cases, known media such as Guillard's F/2, TAP or BG-11 can be used for microalgae.

In an embodiment, one or more algal lines identified to be of interest are transferred from culture flasks into carboys, and then seeded into outdoor photobioreactors. Ponds or raceways can also be used, as is known in the art. Lab scale-up can be practiced, for example, by transferring algal lines from culture plates to flasks in volume of 25 ml, 125 ml, and 500 ml, then transferred into carboys in volume of 2.5 L, 12.5 L, and 62.5 L (using multiple carboys) prior to seeding of polybags or aerated vertical tubular or flow bioreactors such as are commercially available in volumes of 200 L, 400 L, 600 L, and 2400 L as employed by aquaculture or algaculture facilities. Subsequently other bioreactors or raceways can be employed for larger volumes, as is known in the art.

Algae can be cultured under increasing light conditions to harden-off the algae for adapting outdoor light conditions. The light intensity can be from 100, 200, 400, 600 $uE/m^2$-sec indoors to 1200 to 2000 $uE/m^2$-sec outdoors. Various techniques, such as algae culture in photobioreactors, degassing, pH monitoring, and dewatering for biomass harvest, are known in the art. Nitrifying bacteria can be cultured using methods known in the art; in many cases remediation microbes can also be cultured.

Depending on the species, one or more algae and cyanobacteria can be grown on sugars in stirred tanks or fermenters. Suitable species include, but are not limited to, those of genera *Nannochloropsis, Tetraselmis, Chlorella, Scenedesmus*, and *Synechocystis*.

Mixotrophic eukaryotes can be cultured on glucose to densities such as 10 g/L up to 50 g/l or higher. These are added directly into the wastewater basin with no delay in growth. For example if a working concentration is desired of 0.1 g/L in the basin, one 20 L carboy volume at 10 g/L produces 2000 L active volume for wastewater treatment, or one 2000 L airlift reactor produces 200,000 L active volume, with similar scaling as needed.

A proximal microorganism growing system is preferred if there is a need to frequently reinforce the desired strains and species active in the wastewater treatment basins. These species can be selected based on the local environment and the type of wastewater treatment system to be upgraded, and can be grown successfully as polycultures. The microorganism growing system also ensures that the proper level of micronutrients and microbes for promoting overall algal growth are present. In one embodiment, basins at an oil refinery site comprise polycultures of *Monoraphidium, Chlorella, Anabaena, Nitzschia*, and *Scenedesmus*, among other microbes. In one embodiment, basins at other operations comprise several different species of *Scenedesmus, Picochlorum, Chlorella, Nannochlorum* as well as numerous nitrifying bacteria. Identifications of microbe species can be based on morphology, selective plating and genetic sequencing, as is known in the art.

Similarly, standard microbiological culture techniques are known in the art, and can be applied to culture of non-photosynthetic microbes.

This Example further describes a microbe consortium comprising non-photosynthetic prokaryotes mixed with photosynthetic eukaryotes and prokaryotes in certain preferred ratios. In one embodiment, the ratio is calculated on a unit cell basis in this case rather than as a percentage that factors in the relative size and contribution of each cell to the overall consortium's biomass. Basin water can have a ratio at 1:1 when enriched for the photosynthetic eukaryotes and prokaryotes, and up to 10,000:1 when enriched for non-photosynthetic prokaryotes.

Figure 1:
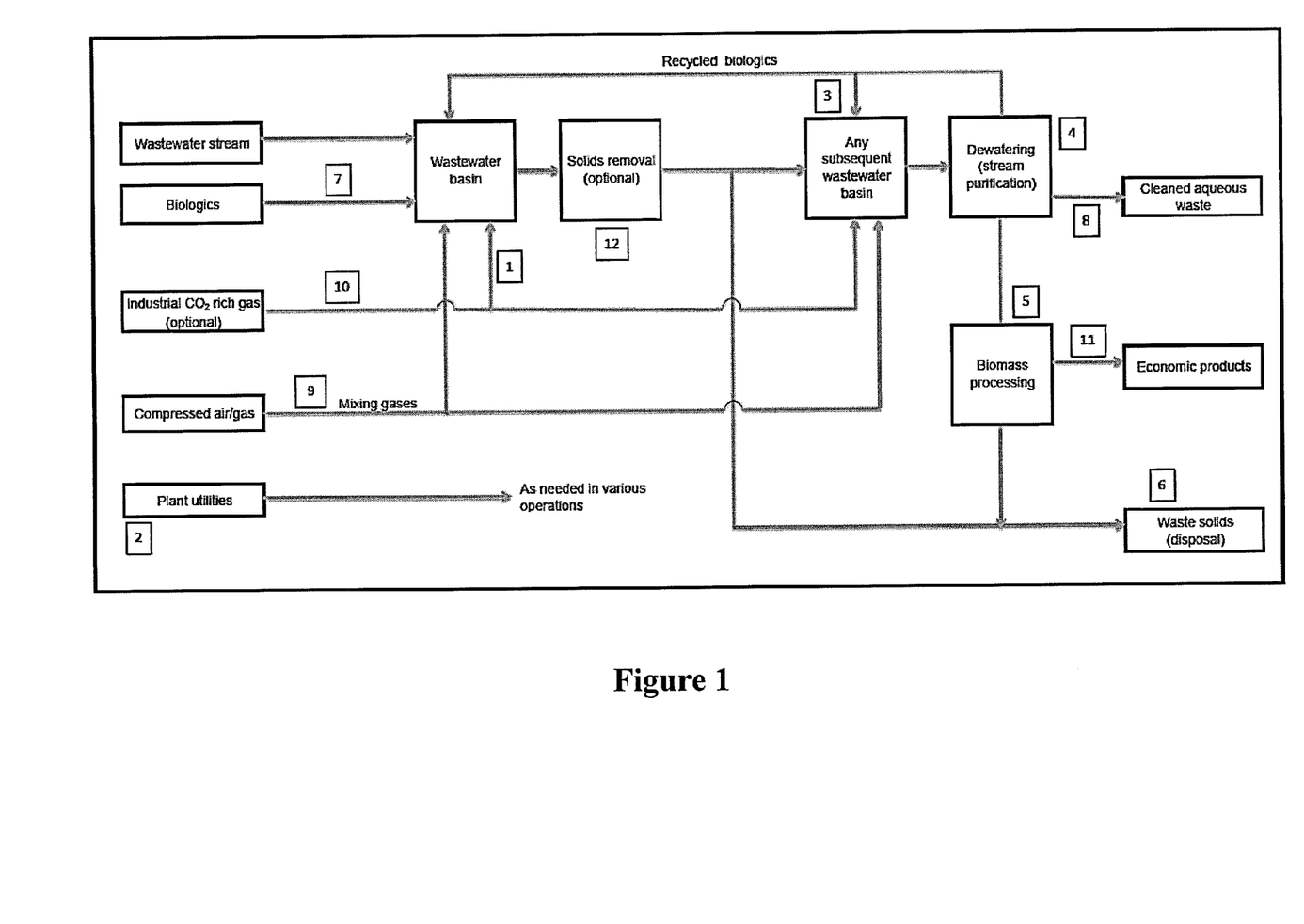
FIG. 1 is a schematic depiction of one embodiment of the wastewater treatment system and process of the present invention.

Enrichment or augmentation of the microbe consortium can occur after the biomass is piped or otherwise delivered into the basin. High-density cultures produced under fermentation can be delivered to the site or produced in mobile treatment unites adjacent to wastewater basins. This stream is shown in FIG. 1 as "Biologics"; it functions in solids enrichment similar to the "Recycled solids" stream.

Example 4

Microbe Enrichment in the Basin

Basins that were previously non-aerated are aerated for approximately 36 hours prior to enrichment of the consortium blend. In some cases the microbes are available as dry powders. In other cases they are available as liquid concentrates or gels. The powders, concentrates, and gels may be loaded with supplemental organic or inorganic chemicals to support or accelerate growth over time. One example is use of glycerin, glycerol, starch, molasses, or other sugars, which serves to maintain viability of the microbes as preservatives and then becomes a food source for non-autotrophic growth in the basin, as well as for stimulation of exopolysaccharide formation. Depending on the site, an operational option is for enrichment microbes to be pre-adapted to salinity, pH, and temperature characteristics of the basin wastewater in addition to natural adaptation over time.

In other cases, enrichment with microbes occurs using biofilters. The specific surface area of the biofilters required can be calculated based on the dissolved nitrogenous, heavy metal, and other waste products present. The surfaces provide a substrate for various archaea, proteobacteria, bacteria, cyanobacteria, benthic organisms, and bioflocs to attach and grow. They are started on the biofilter substrate as in known in the art in water quality management. The oxygenated wastewater comes into contact with the surface on which specific microbes are present to consume or adsorb the chemicals. Combinations of biofilters can comprise a microbe consortium. Biofilters with a predominance of nitrifying bacteria can be used in some embodiments. Biofilters with a predominance of heavy metal-absorbing microbes can be used in other embodiments. The biofilters are dispersed throughout the basins, such as with a multiplicity of random media that are continuously agitated and aerated through the mixing in the basin, or they can be incorporated in flow-through filters for smaller systems.

The systems and methods of the invention are compatible with operation, in series or in parallel, of anaerobic systems for special purposes, as is known in the art in water quality management to supplement the aerobic treatment. For example a portion of the basin or a separate basin lacking mixing can allow proliferation of *Methanobacterium, Methanomethylovorans, Methanolobus*, and *Thermococcus, Halanaerobium*, and other anaerobic Archaea or other microbes.

The systems and methods of the invention are further compatible with physical and chemical methods used in wastewater treatment.

Example 5

Removal of Solids

Solids not required for recycling can be further concentrated by any number of means, such as using adapted centrifuges, filtration systems or a combination thereof. Solids can be harvested using any modular, scalable, and/or cost-effective technologies used in removing biomass during water remediation. In certain embodiments, methods for solid harvest include, but are not limited to, induced air flotation, membrane filtration, and a combination thereof. In one embodiment, the solid removal process is performed in the absence of flocculants, which can damage local ecosystems, increase cost, and be undesirable for further processing of biomass. The step of solids removal enables compliance with effluent regulations such as allowable total suspended solids (TSS) less than 10 mg/L. Some biomass conversion or extraction processes require only dewatering to 30% solids such that fully dry matter is not required.

Another embodiment is application of a solid removal system, such as a hydroclone, which functions to continuously remove the airborne debris continually deposited into the wastewater system. These solid removal systems are important for mineral processing operations. For example, based on a measured nephelometric turbidity unit (NTU), the turbidity of a wastewater after simple removal of small particles is decreased by 83%, from 2.77 NTU to 0.23 NTU. The solid removal system increases the efficiency of the recycle step and increases the conversion value of the biomass by lowering the inclusion of inert silica or other inorganic solids for example. FIG. 1 shows inclusion of an inorganic solids removal system attached to the wastewater system.

Example 6

Compositional Modification: Nutrient Recovery

This Example embodies application to post-oxidation or settling ponds that become active nutrient recovery basins. To illustrate this, batch bio-augmentation trials are run in 18-ton 6-foot deep ponds with untreated wastewater loaded with recycled biomass and added biomass from an auxiliary photobioreactor. Measurements track algal growth as counts, noting any presence of zooplankton grazers, and standard water qualities.

Using post-oxidation water in the test pond with basal pneumatic mixing, biomass can double and triple under intermittent $CO_2$ injection over 3 days from a loading density of 0.1 g/L and 0.067 g/L, respectively. Based on this, total N around 5 mg/L is expected to suffice for 1.5 or 2 doublings during the 3-day hydraulic residence time in ponds prior to solids removal, and results in depletion of N to <0.1 ppm (0.1 mg/L) depending on the density of the microbe consortium. Similarly, microbes can recover S, as another nutrient, resulting in a lowering of levels of sulfates.

While the nutrient recovery system described in this Example illustrates nutrient recovery in an active wastewater basin system, such as having inflow at or exceeding 300 gal/min and hydraulic residence time at or exceeding 3 days, this system can also be applied to lagoons with lower inflow rates and much longer residence time, as well as other systems with higher inflow rates and also relatively longer residence times.

Example 7

Compositional Modification: Metals as Specific Pollutants

This Example describes use of microbes that synthesize exopolysaccharides (EPS), with or without the presence of added carbon, to enhance the reduction in heavy metal concentrations. For example, the anionic, sulphate-rich or uronic, acid-rich exopolysaccharides synthesized by *Haloferax* or *Rhodoceros*, or EPS synthesized by other microorganisms, may enable these microbes to bind and remove heavy metals from solutions. This microbial feature offers natural biopolymers as biosorbents to complement physical and chemical methods. For example they can serve in a final finishing treatment of the polluted hyposaline or hypersaline wastewater.

For the development of suitable microbe consortium, wastewater is screened for viable microbes, or cultures are adapted to growth, on heavy metals following standard protocols as known in the art (for example in G. Popescu and L. Dumitru. 2009. Biosorption of some heavy metals from media with high salt concentrations by halophilic Archaea. *Biotechnology & Biotechnological Equipment* 23/2009/SE Special Edition/On-Line, pp 791-795). Wastewater or cultures in exponential growth phase are plated in liquid or on agar-solidified medium with varying concentrations of heavy metals. Culture inocula are diluted to have an optical density at 660 nm between 0.22-0.25. The plates, tubes, or flasks are incubated at 20, 25, and 37° C. for ten days. Heavy metals used in micro-filtered stock solutions in distilled water come from standard commercial sources for $SrSO_4$, $BaSO_4$, and $ZnSO_4$, $K_2CrO_4$, $NiSO_4$, and $Pb(NO_3)_2$. The range of concentrations for heavy metals represent that in the wastewater and in the minimal allowance for outflow, such as 0.005 to 80 mM for the latter three compounds. Values are typically 100 to 3,000 mg/L $Sr^{2+}$, 30 to 6000 mg/L $Ba^{2+}$, or 20-350 mg/L $Fe^{2+/3+}$, as representative of levels such as in wastewater from hydraulic fracturing, with lower maximal levels if the water is pre-treated first by other methods; note that minimal outflow levels can be at 10 mg/L each for barium and strontium for the natural gas industry. Colonies are subcultured for further increase for enrichment purposes.

This Example further illustrates the capacity of microbes to reduce the heavy metals load in wastewater or other liquid, including by biosorption. Metal biosorption is shown by growing the strains on wastewater, or on basal medium with similar metal load, containing 0-3 M NaCl and 0-2.5% glucose according to general protocols (G. Popescu and L. Dumitru, 2009). Erlenmeyer flasks containing 90 ml of culture media are inoculated with 10 ml of microbe culture in exponential phase. Cultures are incubated in shake flasks at 37° C., 100 rpm, for representative basin retention times such as 10 days. Culture growth is determined spectrophotometrically (at 660 nm) at Day 3 and Day 10 for example, and compared with a blank represented by culture medium lacking added microorganisms. The cultures are collected after centrifugation at 6000 rpm for 30 minutes. The final heavy metals concentration from the supernatants is determined using the Merck AQUAQUANT or MERCKOQUANT kits specific for each metal ion. When done in this manner, heavy metals originally present in different concentrations are significantly reduced: 1.0 mM Pb (331 mg/L), 2.5 mM Cr (485 mg/L), 0.1 mM Zn (16 mg/L) or 0.5 mM Zn (80.5 mg/L) and 1.0 mM Ni (130 mg/L) result in Pb (5 mg/L), Cr and Zn (0.8 mg/L), and Ni (5 Mg/L), respectively, for example (G. Popescu and L. Dumitru, 2009). Reductions in levels of barium and strontium can be similarly measured. In some cases the metals reduction occurs with or without added carbon sources. For example, using high salt-tolerant haloarcheal strains from the *Haloferax* genus, Ni concentration was reduced from 130 mg/L to 0.2 mg/L after a residence time of 10 days in the presence of added glucose, and Cr was reduced from 485 mg/L to 0.8 mg/L or 1.6 mg/L with or without added glucose.

Example 8

Other Compositional Modification

This Example describes modification of the composition of specific wastewaters. One embodiment is for the flow-back and produced water associated with shale gas and tight oil production in upstream processes of the petroleum or oil industry. Flow-back is a mixture of hydraulic fracturing fluid and naturally occurring substances including natural formation water. Produced water is generally water present in the reservoir that surfaces with the crude oil or natural gas. These wastewaters can be of very high salinity and total dissolved solids (the salinity level of these wastewaters can be three times higher than seawater). The wastewater can also have high pH and high levels of sulfates, total dissolved solids, metals (such as barium and strontium), residual fracturing fluid, radioactive materials, methanol, isopropanol, benzene, xylene, polycyclic aromatic hydrocarbons, and other organic compounds.

The wastewater is stored in basins, pits or tanks, usually temporarily or as an intermediate step before disposal at a site such as injection wells. However, some locations have insufficient disposal capacity or are unable to handle certain levels of contaminants. Other locations are retrofitting municipal or other wastewater treatment facility to include processing of flow-back and produced water.

This invention provides systems and methods for recycling of viable and non-viable solids from the wastewater pit to enrich for a microbe consortium comprised of microbes that are tolerant of the metal levels, high salinity, high levels of dissolved solids, high pH, and/or high levels of other contaminants in the flow-back and produced water.

This invention also provides a method for enrichment of solids to include further addition of biologics. Examples of algae useful according to the present invention include, but are not limited to, *Chlorella, Closterium, Asteromonas, Halospirulina, Spirulina, Uronema,* and *Dunaliella* and others with phytochetalin properties; can further include the microbes *Pseudomonas, Thiobacillus, Escherichia, Bacillus, Halomonas*; can further include addition of biologics for hydrocarbon degradation; and can also include other unnamed or unidentified microbes such as those also associated with sulfate reduction or halotolerant properties. As is known in the art, some microbes can accumulate metals by adsorption onto cell wall surfaces and by absorption; microbe species differ in ability to sequester differing metals. For the photosynthetic and aerobic microbes, or for other mixing or even degassing purposes, this invention teaches mixing of the wastewater basin for the microbes to thrive and thus remediate more effectively. Removal of the excess solids, as practiced in this invention, thus compositionally modifies the wastewater to more desirable profiles for subsequent transfer to compatible wastewater treatment facilities or for disposal. FIG. 1 shows an example of the wastewater treatment process of the present invention.

While this exemplifies compositional modification of wastewaters in an upstream process specific to the petroleum industry, this Example is not limited to just one point of wastewater generation within an entire value chain of raw material to finished goods, or within only one industry. In another embodiment, the present invention is useful in integrated petrochemical industry.

Example 9

Microbe Consortium

This Example describes that microbe consortia can vary in compositions based on their suitability for different types of wastewaters. When the biomass contains a dominant species of photosynthetic algae, maximum biomass productivity varies with N:P ratios. When the biomass contain one or more dominant species, an optimum N:P ratio for biomass productivity can be observed. The preferred N:P ratio can vary depending on algae species, such as, 25:1 for *Picochlorum* sp. #1, 50:1 for *Picochlorum* sp. #2, 15:1 for *Picochlorum* sp. #3; 40:1 for *Nannochlorum* sp. #1; and 10:1 for *Nannochloropsis* sp. #2. The dominant algae species can be maintained using recycled solids or other solid nutrients. In this example, the urea nitrogen varies against a background of ammonium phosphate. Starting cell densities are about $7 \times 10^7$ cells per ml. Optical density (OD) at 750 nm is measured using a spectrophotometer to generate growth curves under ambient temperatures and a 12-hour-day light regime typical of Hawaii.

In certain embodiments, the N:P ratio is 100:1 to 1:100, or any value therebetween.

Further, the composition of the microbe consortium can generate variable outcomes for bioenergy applications. Table 1 shows fatty acid methyl esters as combustible intermediate fuels generated by biomass containing the noted algae genera. The carbohydrate to protein ratio indicates some biomass is more suitable or efficient for biogas generation than others, based on higher relative carbohydrates. Related illustrations are shown in Example 10.

TABLE 1

Yields from biomass converted to fatty acid methyl ester, FAME, and corresponding carbohydrate, protein levels under growth conditions.

| Genus | Carbohydrate:Protein (% ash-free dry weight) | FAME (% ash-free dry weight) AOAC Method #954.02 |
|---|---|---|
| *Chlorella*-type | 52:40 | 9 |
| *Chlorella*-type | 34:55 | 11 |
| *Nannochloropsis* | 29:50 | 22 |
| *Scenedesmus* | 34:51 | 16 |
| *Parachlorella* | 72:20 | 8 |
| *Picochlorum* #2 | 43:56 | 15 |
| *Picochlorum* #3 | 29:57 | 14 |
| *Nannochlorum* | 31:54 | 15 |
| *Picochlorum* #1 | 38:57 | 5 |

This Example further illustrates maintenance of a consortium with a dominant photosynthetic composition comprised of both *Nannochloropsis* and *Scenedesmus* for at least 2 months outdoors at 800 L using industrial site water and intermittent injected industrial $CO_2$. It has maintained a ratio of about 100:1 on a cell count basis, namely $10^8$ *Nannochloropsis*:$10^6$ *Scenedesmus* (generally 1 or 2-celled).

This Example further illustrates that, in maintaining a microbe consortium, the photosynthetic cell load can remain compatible with variable non-photosynthetic bacterial loads. Data from work conducted for 5 months using 31-inch deep 22,000 L recirculation raceways in shrimp farming demonstrate the flexibility of the complex microbial symbiosis within a range of ABR (algae to bacteria ratios) while maintaining acceptable water quality. This chemistry can be accelerated in the refinery system with the practice of biological treatment; the nitrifying bacteria that oxidize ammoniac nitrogen to nitrate are already established prior to loading with recycled biomass or other algae. In this system, the pH is maintained at about 7.8, dissolved oxygen level ranges from 8.9 to 9.2 mg/L and temperature ranges from 28.5 to 29.7° C. from morning to evening, respectively.

The levels of total ammonia nitrogen and nitrite nitrogen accumulate when the raceways are stocked with high-density shrimp for waste generation. By week 4, nitrifying bacteria usually have populated the raceway and efficiently oxidize the nitrite and total ammonia nitrogen to nitrate. The water column is dominated by unicellular green algae. Nitrate levels begin to accumulate as nitrite concentration decreased and the microbe consortium co-adapts.

Algae to bacteria ratios of the raceway can be 1:1 to 1:100, or any value therebetween, with bacteria ranging from baseline to 2 orders of magnitude higher relative to algae (e.g., $5 \times 10^6$ algal cells/ml vs. $2 \times 10^8$ bacterial cells/ml). Bacterial count ranges from $1.2 \times 10^7$ to $5.4 \times 10^8$ cells/ml; algal counts ranged from $1.1 \times 10^5$ to $1.9 \times 10^7$ cells/ml when it reaches the equilibrium state. This is excellent for a deep pond. Using DNA fingerprinting, Chlorella is confirmed as the dominant species in this system. Intermittent measurements show that the dry weight of suspended particles in the production unit ranged from 0.027 to 0.54 g/L for a mean of $0.22 \pm 0.13$ g/L (n=13).

Example 10

Compatibility with Existing Wastewater System Conditions and Practices

This Example shows compatibility of augmentation of biomass with wastewater. Volumes of 500 ml of wastewater are augmented with green algae of 3-5 micron size to achieve a green cell density of about one million cells per ml. The microbe consortium is allowed to grow for 12 days. The cultures are maintained in 1 L beakers open to the atmosphere under a plastic cover to shield it from the rains. Biomass production (growth) is monitored every three days using cell density measurements based on counts of green cells under a microscope; measurement by optical density at 750 nm is not possible due to murky water with the presence of waste debris. Table 2 shows steady growth of biomass containing photosynthetic green algae and non-photosynthetic bacteria in the wastewater. The results indicate that yields improve more than three times within three days on a count basis (from about 0.02 g/L to 0.07 g/L, on an estimated weight basis), and attain about 10 million cells per ml. The biomass yield approaches 0.2 g/L before nutrient depletion, which results in a decline in green cell counts.

TABLE 2

Cell density for biomass containing green algae grown in industrial wastewater from two basins.

| Time (days) | Basin #1 Average green cell density (cells/ml) | Basin #2 Average green cell density (cells/ml) |
| --- | --- | --- |
| 0 | 1.41E+06 | 1.81E+06 |
| 3 | 4.58E+06 | 5.30E+06 |
| 7 | 7.74E+06 | 7.14E+06 |
| 10 | 1.16E+07 | 1.04E+07 |
| 12 | 8.82E+06 | 4.77E+06 |

This Example further illustrates that the combination of pneumatic mixing and augmentation of biomass allows use of additional carbon dioxide to improve and enhance the photosynthetic microbes that consume the N-, S- and P-containing organic substances. The concentration of $CO_2$ is important for maintaining the pH of the wastewater treatment system within pH 6 to 9. In many industrial sites, $CO_2$ is introduced to the system via a site-wide $CO_2$ distribution piping. It serves to regulate pH to enable maximum effect of the biologics used in remediation of hydrocarbons in refinery wastewater, for example. The biologics serve additional functions of enhancing organic removal efficiency, improving cold weather operations and suppressing growth of filamentous microbes.

A by-product of any photosynthetic cell augmentation is the elemental oxygen produced during photosynthesis. This oxygen is readily available for use in the ongoing biologic processes.

Example 11

Mixotrophs, Heterotrophs and Facultative Microbes

This Example describes a microbe consortium comprised in part of mixotrophs. For mixotrophs, hydrocarbon-fed growth and photosynthetic growth are additive and non-competitive. Hydrocarbon-fed cultivation results in increased yield per unit area such as for deep ponds. Several species, for example, are isolated from municipal wastewater and from other industrial basin samples and are identified by genetic sequencing to be *Chlorella, Monoraphidium* and *Scenedesmus*. Strains are screened in 96-well plates for growth that is mixotrophic (with light and sugar source) and phototrophic (with light only) conditions. These species show 47%, 40%, and 12% increase in biomass, respectively, over phototrophic conditions based on cell counts. Higher growth correlates to higher nutrient recovery from the growth medium, as is known in the art.

This Example further describes microbes that synthesize exopolysaccharides (EPS), with or without the presence of added carbon, known to enhance the reduction activity of heavy metal concentrations. For example, the anionic, sulphate-rich or uronic, acid-rich exopolysaccharides synthesized by *Haloferax* or *Rhodoceros*, or EPS synthesized by other microorganisms, may enable these microbes to bind and remove heavy metals from solutions. This microbial feature offers natural biopolymers as biosorbents to complement physical and chemical methods. For example they can serve in a final finishing treatment of the polluted hyposaline or hypersaline wastewater.

For growth of the microbes in the basin themselves, and in certain wastewaters, the carbon:nitrogen ratio is controlled by adjusting molasses and other carbon-rich inputs. In some embodiments, the carbon directly, or indirectly after breakdown, feeds heterotrophic and facultative prokaryotes and eukaryotes and can also enhance the biosorption capacity of metal ions via exopolysaccharide formation by the microbes.

Using this general strategy, those skilled in the art can identify and use additional species for specific wastewater conditions and preferred hydrocarbons such as glycerin or acetate, and under seasonal conditions such as for performance in cold weather at or less than 13° C.

Example 12

Production of Bioenergy from Microbial Biomass

This Example illustrates methods for production of fatty acid methyl esters (FAME), a combustible liquid and an intermediate for further upgrading to other biofuels. Microbial biomass is converted via processes such as supercritical methanolysis, as described in U.S. Pat. No. 8,212,062. Biomass lipid composition is determined as is known in the art.

Using this method, it is determined that a microbe consortium has a total FAME content of 13.5% per dry weight of biomass. It can have a fatty acid profile as in Table 3. On an ash-free dry weight basis, this normalizes to 28.5% fuel. In comparison, a soybean contains about 20% oils. By extrapolation, one thousand metric tons of sludge after conversion could yield about 35,700 gallons of high quality biofuel. The biofuel composition is comprised of 75% saturated and monounsaturated hydrocarbons, suited for combustion.

TABLE 3

Free fatty acid profile of fuel after conversion of sludge by supercritical methanolysis.

| Chemical Name | Percent Normalized (%) |
| --- | --- |
| 16:0 | 22.9 |
| 16:1 | 4.9 |
| 18:0 | 7.0 |
| 18:1 | 40.3 |
| 18:2 | 5.9 |
| Unknown possible Di-Ester | 19.0 |

When enriched for microalgae, and not allowed to settle for decomposition over time, this content can be as much as 45% FAME per dry weight of biomass. These data are based on already-proven profiles of basin sludge and scaled performance of selected biofuels algal species.

The conversion process yields fuel as well as concentrated solids or "bottoms" from the distillation column. Analyzing the "bottoms", the sludge samples also comprise 33.8% other non-ash materials that are likely combustible, and 52.7% ash (non-combustible). Based on the biomass composition, one metric ton of sludge can produce about 135 L biofuel with 530 Kg ash and 340 Kg of other non-ash materials of denatured carbohydrates and proteins. It is worth noting that, in comparison, sludge biomass comprised largely of cultivated biofuel-intended algae that are not allowed to settle but remain suspended through mixing prior to harvest can produce twice the amount of biofuel for the same amount of post-conversion ash that is generated by the same process.

Additional data indicate that the composition of the "bottoms" is favorable to other applications and need not be disposed in a landfill. This reduces the number of hazardous waste containers that would be required to properly dispose of the wastewater treatment sludge. This in itself could make the investment payback within a couple of years depending on the cost of disposal for one barrel and the scale of the operation. Work indicates that the "bottoms" support excellent growth of algae. This material might therefore be suitable to combine with fertilizer or composting operations or soil conditioning to augment microbial and plant growth. However, any concentrated metals or other compounds in specific wastewater converted sludge "bottoms" may interfere with effective microbial or biological action and thus more analysis specific to a specific sludge should be performed.

This Example further describes application of the biomass for chemical intermediates, namely 5-(chloromethyl) furfural (CMF). In one embodiment, the present invention uses the INCITOR™ process to create biofuels from waste materials. When the majority of the basin sludge is composed of decaying humic material and ample polyaromatic hydrocarbons, less than 5% of the total mass yielded CMF. When solids remain suspended and cannot decay over long cycles, abundant C5 and C6 carbohydrates are present and yields can easily double, triple and more.

Example 13

Applications in Petroleum and Energy Industries

This Example lists the relative value of application of this invention. Oil or energy companies, as primary operators of upstream hydraulic fracturing operations and downstream oil refineries, are key stakeholders affected by the Energy Independence and Security Act of 2007. Their adoption can only strengthen and accelerate achievement of the RFS mandate. Minimum CAPEX is anticipated for deploying the approach at numerous sites. Oil refineries have already built-in much of the required microbe-friendly combination of Water-Nutrients-Carbon-Land-Climate, with very few fresh inputs required. Most of the biomass production process steps are already practiced during wastewater treatment on-site, and oil companies generally already perform downstream steps normally included in the life cycle analysis—such as fuel processing and transport. Biofuels can be generated and consumed on site or blended for RINS under RFS2. Replication occurs across industrial wastewater facilities with similar regulatory mandates. Current wastewater sludge removal and disposal result in recurring costs and wasted biological treatment units (BTUs) with strong contribution to volumetric targets. A very small refinery may generate an estimated 30,000 gallons/year of biodiesel (as FAME) under non-aggressive assumptions using existing facilities. At larger refinery wastewater treatment systems, this could be about 10 million gallons of FAMEs/year or about 10% of RFS2 targets, a significant volumetric contribution using this invention with existing infrastructure. Carbon dioxide recycling within the wastewater treatment operations can produce an impact on greenhouse gas emission.

It should be understood that the examples and embodiments described herein are for illustrative purposes only and that various modifications or changes in light thereof will be suggested to persons skilled in the art and are to be included within the spirit and purview of this application. It would also be readily apparent to a person skilled in the art that varying substitutions and modifications may be made to the invention disclosed herein without departing from the scope and spirit of the invention.

Additionally, one skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

The invention illustratively described herein suitably may be practiced in the absence of any element or elements, limitation or limitations not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference to the extent not inconsistent with the explicit teachings herein.

This invention offers nearly all wastewater treatment systems significant performance improvement by integrating the requirements for microbe consortia growth into a robust, functioning system. It uses established wastewater system infrastructure and provides features that allow enhanced system performance.

We claim:

1. A method of treating wastewater, comprising:
    providing a basin for receiving wastewater;
    introducing wastewater into the basin, wherein the hydraulic residence time of the wastewater liquids and solutes is at or exceeding 3 days;
    mixing wastewater in the basin, wherein the mixing step comprises generating turbulence from the bottom of the basin to the top of the basin;
    maintaining, in the basin, a microbial consortium comprising a population of microorganisms that consume one or more nitrogen (N)-, phosphorus (P)-, sulfur (S)- or metal-containing substances; and
    discharging the wastewater.
2. The method, according to claim 1, wherein the mixing step comprises introducing compressed gas into the basin.
3. The method, according to claim 2, wherein the compressed gas comprises $CO_2$, $O_2$, or $N_2$, or any combination thereof.
4. The method, according to claim 2, wherein the compressed gas is released from a position having a depth of deeper than 70% of the entire depth of the basin.
5. The method, according to claim 1, further comprising removing solids from the wastewater before discharging the wastewater.
6. The method, according to claim 1, further comprising removing inorganic solids from the wastewater.
7. The method, according to claim 1, wherein wastewater flows into the basin at or exceeding 300 gal/min.
8. The method, according to claim 1, wherein the microbe consortium comprises suspended solids in excess of 0.009 g/L.
9. The method, according to claim 1, wherein the microbe consortium comprises non-photosynthetic prokaryotes mixed with photosynthetic eukaryotes and prokaryotes in ratios of 1:1 to 10,000:1.
10. The method, according to claim 1, wherein the microbe consortium comprises mixotrophs.
11. The method, according to claim 1, wherein the microbe consortium comprises one or more microorganisms selected from *Acaryochloris, Amphora, Anabaena, Anacystis, Anikstrodesmis, Asteromonas, Azoarcus, Bacillus, Botryococcus, Chaetoceros, Chlorella, Chlorococcum, Closterium, Crocosphaera, Cyanotheca, Cyclotella, Cylindrotheca, Desmodesmus, Dunaliella, Escherichia, Euglena, Halobacterium, Halomonas, Halospirulina, Hematococcus, Isochrysis, Lyngbya, Marinichlorella, Micratinium, Microcystis, Monochrysis, Monoraphidium, Nannochloris, Nannochlorum, Nannochloropsis, Navicula, Nephrochloris, Nephroselmis, Nitrobacter, Nitrococcus, Nitrosococcus, Nitrosomonas, Nitrosopumilus, Nitrospina, Nitzschia, Nodularia, Nostoc, Oochromonas, Oocystis, Oscillatoria, Pavlova, Pediastrum, Phaeodactylum, Picochlorum, Platymonas, Pleurochrysis, Porphyra, Prochlorococcus, Pseudoanabaena, Pseudomonas, Pyramimonas, Rhodoceros, Rhodocyclus, Rhodomonas, Rubrivivax, Scenedesmus, Selenastrum, Spirulina, Stichococcus, Synechococcus, Synechocystis, Tetraselmis, Thalassiosira, Thermosynechocystis, Trichodesmium, Thiobacillus, Uronema*, and *Zoogloea*.
12. The method, according to claim 1, wherein the microbe consortium can survive in a wastewater containing N:P ratios in excess of 10:1.
13. The method, according to claim 1, further comprising introducing one or more biologics into the basin.
14. The method, according to claim 1, further comprising introducing at least one hydrocarbon compound into the basin.
15. The method, according to claim 14, wherein the hydrocarbon compound is glycerin.
16. The method, according to claim 1, further comprising retaining one or more biologics contained in the wastewater discharged from the basin; and re-introducing the retained one or more biologics into the basin.
17. The method, according to claim 1, further comprising maintaining the wastewater in the basin at a pH of 5.5 to 8.5.
18. The method, according to claim 1, further comprising introducing $CO_2$ and/or bicarbonate into the basin.
19. The method, according to claim 1, wherein the wastewater treatment method is performed at a temperature of less than 15° C.
20. The method, according to claim 1, further comprising recovering nutrients and/or biomass contained in the wastewater discharged from the basin.
21. The method, according to claim 1, wherein the wastewater introduced into the basin is from the oil industry.

* * * * *

UNITED STATES PATENT AND TRADEMARK OFFICE
CERTIFICATE OF CORRECTION

PATENT NO.         : 9,120,686 B2
APPLICATION NO.    : 14/209724
DATED              : September 1, 2015
INVENTOR(S)        : Adelheid R. Kuehnle, Martin Johnson and Robert J. Schurr Page 1 of 1

It is certified that error appears in the above-identified patent and that said Letters Patent is hereby corrected as shown below:

In the Specification

Column 4,
Line 41, "mixotrophy." should read --mixotrophs.--.

Column 15,
Line 31, "$MgCl_2.6H_2O$" should read --$MgCl_2 \cdot 6H_2O$--.
Line 31, "$CaCl_2.2H_2O$" should read --$CaCl_2 \cdot 2H_2O$--.

Column 19,
Line 8, "$MgCl_2.6H_2O$" should read --$MgCl_2 \cdot H_2O$--.
Line 9, "$CaCl_2.2H_2O$" should read --$CaCl_2 \cdot 2H_2O$--.

Signed and Sealed this
Tenth Day of May, 2016

Michelle K. Lee
*Director of the United States Patent and Trademark Office*